INVENTORS.
Donald A. Glaser
Woodrow W. Pendleton
Carlton A. Bird

May 28, 1968   D. A. GLASER ET AL   3,385,123
DRIVE MECHANISM FOR ROLL DUPLICATOR
Filed Sept. 7, 1965   2 Sheets-Sheet 2
Fig.3.
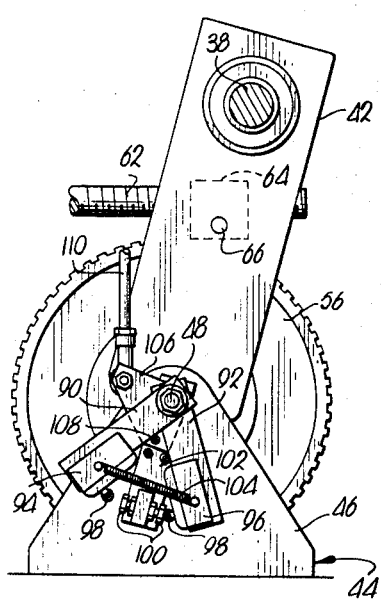
Fig.4.
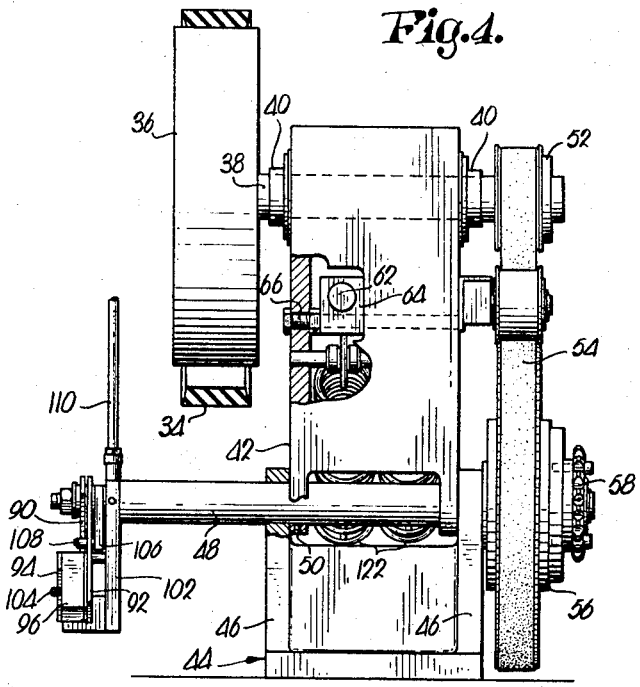
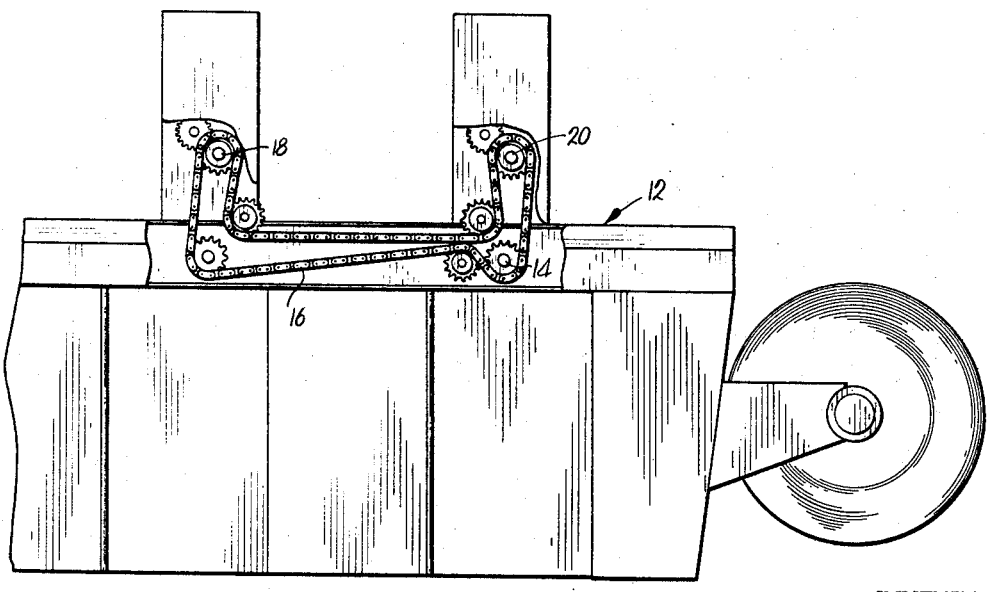
Fig.2.
INVENTORS.
Donald A. Glaser
Woodrow W. Pendleton
Carlton A. Bird
BY
Hovey, Schmidt, Johnson & Hovey
ATTORNEYS.

Patented May 28, 1968

3,385,123
DRIVE MECHANISM FOR ROLL
DUPLICATOR
Donald A. Glaser, Woodrow W. Pendleton, and Carlton
A. Bird, Emporia, Kans., assignors to Didde-Glaser,
Inc., Emporia, Kans., a corporation of Kansas
Filed Sept. 7, 1965, Ser. No. 485,340
3 Claims. (Cl. 74—230.17)

ABSTRACT OF THE DISCLOSURE

A constant speed drive shaft is connected to a driven shaft by a belt and pulley assembly in which one of the pulleys is of the variable pitch type. Power from the driven shaft is transferred to a sprocket by a timing belt drive, the axes of rotation of the driven shaft and such sprocket being in parallelism. The driven shaft is journalled on mounting structure which may be pivoted about the axis of the sprocket, maintaining the axis of the driven shaft equidistant from the sprocket axis at all times. A servomechanism is coupled with the mounting structure to effect shifting of the latter as desired to control the speed of rotation of the sprocket.

---

The invention relates to improvements in power drives and, more particularly, to a variable speed drive mechanism suitable for use with a printing press equipment.

In printing machines, such as roll-type duplicators or the like, it is oftentimes necessary to vary the speed of the drive shaft for the rolls of such a machine. It has been the usual practice with equipment of this nature to provide a variable speed drive unit wherein the power source thereof, comprised of an electric motor or the like, is physically shifted along a predetermined path of travel to, in turn, vary the operating disposition of a variable pitch pulley coupled to the drive shaft of the motor. The size and weight of the motor required to accomplish this function is significant since inertia effects substantially limit the ease with which the motor may be shifted. In addition, the motor mount is never completely free of undesirable vibrations because of the fact that the motor cannot be rigidly secured to the assembly frame. Furthermore, motor mounts of this type require considerable space because of the necessity of providing clearance for the motor and mount therefor throughout its range of movement.

The present invention overcomes the disadvantages of the drive units described hereinabove by providing an improved drive mechanism which permits variations in operating speeds of a drive shaft over a relatively wide range, without having to shift a motor as is required in the manner described above with respect to conventional drive units. Also, the mechanism of this invention is capable of being actuated by the positioning of an easily moved control lever for a remote servomechanism operable to change the ratio of a driven variable pulley and such feature represents a distinct improvement over the control means for conventional units wherein it has been necessary to close an electric switch and to maintain the switch closed until the proper operating speed has been attained. The operating speed change, using such a procedure, is a function of time, rather than a function of lever position as in the present invention.

It is, therefore, the primary object of the present invention to provide an improved variable speed drive mechanism for use with a rotatable shaft wherein the speed of rotation of the shaft may be varied by the selective movement of a lever whose position through a servomechanism dictates the relative disposition of a pair of pulleys relative to each other and without having to shift a prime mover with respect to the shaft as has been heretofore necessary with conventional power drive mechanisms of this nature.

Another object of the present invention is the provision of a drive mechanism of the type described which is suitable for use with apparatus such as printing press equipment requiring infinite speed changes of a rotating shaft over a relatively wide range, wherein a change in shaft operating speed may be made in a minimum of time and with a minimum expenditure of effort on the part of the operator of the equipment.

Still another object of this invention is the provision of a drive mechanism of the type described which is responsive to the positioning of a control lever rather than the actuation of an electrical switch or the like so that the drive shaft will reach and maintain a predetermined speed in response to the positioning of the lever rather than being responsive to the time of actuation of an electrical switch as has heretofore been necessary with conventional equipment.

In the drawings:

FIG. 2 is a side elevational view of a printing machine with which the drive mechanism of FIG. 1 may be utilized;

FIG. 3 is a fragmentary, side elevational view of the mechanism illustrating dispositions of certain of the parts thereof when the mechanism is in an actuated condition; and FIG. 4 is a cross-sectional view taken along line 4—4 of FIG. 1.

Figure 1:
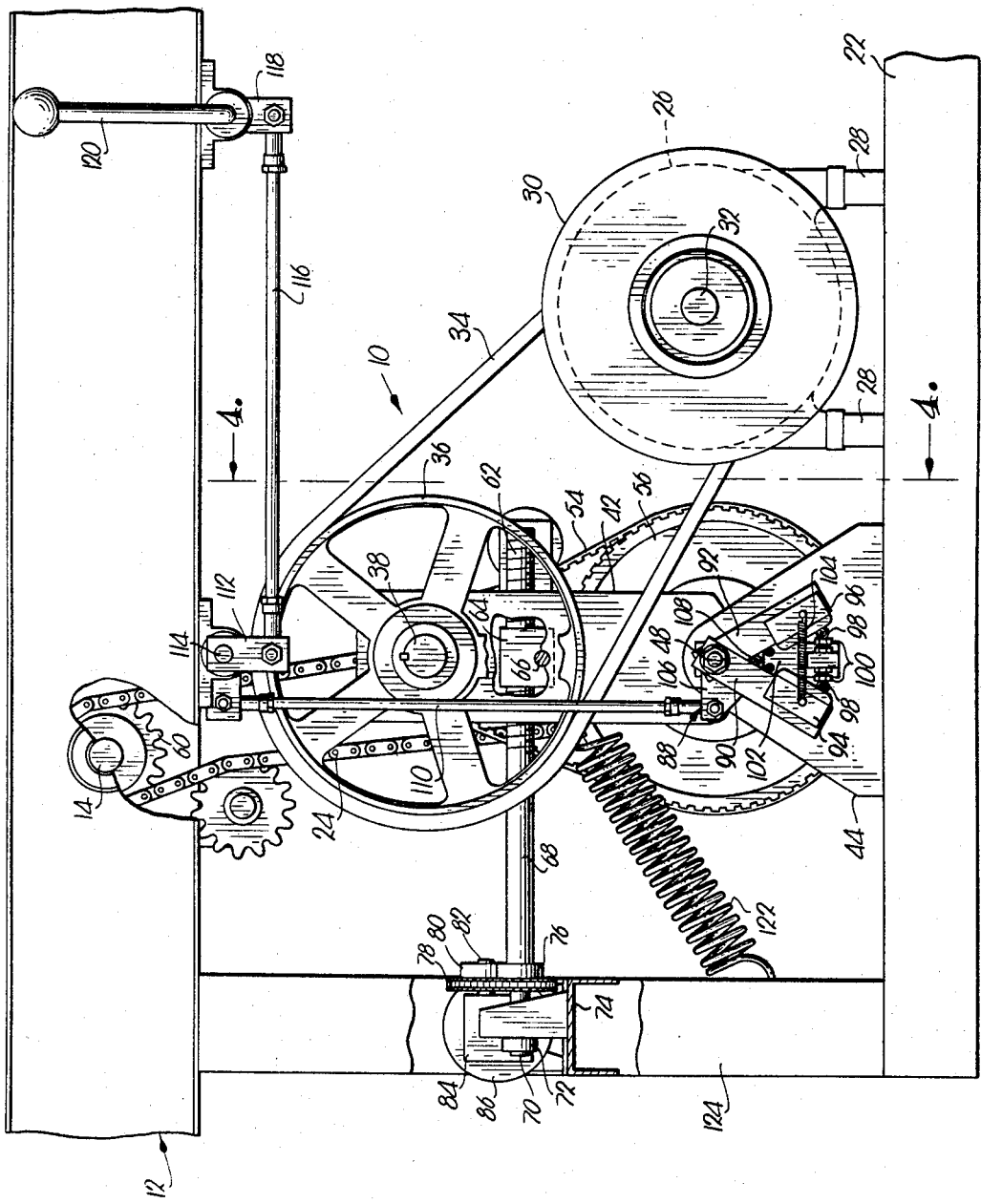
FIGURE 1 is a side elevational view of the drive mechanism of this invention, parts being broken away to reveal details of construction.

Power drive mechanism 10 illustrated in FIGS. 1, 3 and 4, is adapted for use in a variety of applications. However, for purposes of illustration, mechanism 10 is associated with a printing machine 12 shown in FIG. 2, wherein a drive shaft 14 is coupled by means of an endless, flexible chain 16 to individual drive shafts 18 and 20 which, in turn, are coupled to respective rolls forming parts of machine 12. It is oftentimes necessary to vary the speeds of the rolls of machine 12 and, for this reason, the speed of rotation of shaft 14 is required to be varied.

Chain 16 is normally disposed at one side of machine 12 and is coupled to the various shafts 14, 18 and 20 by sprockets in the usual manner. Idler sprockets are also utilized as is well known. For purposes of illustration, shaft 14 is horizontally disposed and is spaced above the base 22 forming a part of the structure of machine 12, base 22 being illustrated in FIG. 1. Mechanism 10 is mounted on base 22 and is disposed below shaft 14. An endless, flexible chain 24 interconnects mechanism 10 and shaft 14 in a manner hereinafter described.

Mechanism 10 includes a reversible electric motor 26 having legs 28 supporting the same on base 22. A variable pitch pulley 30 is secured to the drive shaft 32 of motor 26 for rotation therewith. An endless, flexible belt 34 connects pulley 30 with a pulley or wheel 36 spaced therefrom as shown in FIG. 1. Pulley 36 is is secured to one end of a shaft 38 which, in turn, is journalled by bearings 40 in the upper end of a swingable arm 42. Pulley 36 is disposed substantially within the vertical plane of pulley 30 and is rotatable in response to the actuation of motor 26.

A support 44 having a pair of spaced, generally upright sides 46 is secured to base 22 as shown in FIGS. 1 and 4. A shaft 48 extends through sides 46 and is rotatable with respect thereto. The lower extremity of arm 42 is secured by setscrews 50 to shaft 48 for rotation therewith. Thus, arm 42 is mounted for swinging movement with respect to base 22 in a vertical plane substantially parallel to the plane of pulleys 30 and 36.

A toothed sprocket 52 is secured to the opposite end of shaft 38 for rotation therewith. A toothed timing belt 54 connects sprocket 52 with another and larger toothed sprocket 56 rotatably mounted on the proximal end of shaft 48, sprockets 52 and 56 being substantially in the same vertical plane as shown in FIG. 4.

A sprocket 58 is rigidly coupled to sprocket 56 for rotation therewith, and chain 24 interconnects sprocket 58 with a sprocket 60 secured to shaft 14 as shown in FIG. 1. Thus, power is transmitted from motor 26 to shaft 14 through pulleys 30 and 36, through sprockets 52 and 56, and finally through sprockets 58 and 60. It is evident that the position of arm 42 will determine the speed of rotation of shaft 14 inasmuch as the speed of rotation of shaft 38 will depend upon the disposition of pulley 36 with respect to pulley 30. Hence, it is desirable that arm 42 be selectively moved to permit variations in the rotation of speed of shaft 14 without having to shift motor 26 as has heretofore been necessary with conventional drive units employed with machines of this type.

Servo means is provided to selectively vary the position of arm 42, such means including a screw 62 threadably extending through and coupled with a coupling device 64 carried by arm 42. Device 64 is rotatably mounted on a shaft 66 secured to arm 42 to compensate for changes in the position of screw 62 as arm 42 is swung about the axis of shaft 48.

Screw 62 is provided with a shank 68 having an outer end 70 mounted in a bearing 72 carried on a platform 74 forming a part of the structure of machine 12. Bearing 72 is of the type which permits small displacements of end 70 so that screw 62 may shift slightly upwardly or downwardly as arm 42 is swung in response to the rotation of screw 62. A sprocket 76 is secured to shank 68 and is coupled by an endless, flexible chain 78 to a sprocket 80 secured to the output shaft 82 of a gear reducer 84, the latter in turn being coupled to the output shaft of a reversible electric motor 86 mounted on platform 74. It is to be understood that a motor and suitably spaced reducing sprockets therefor may be employed in lieu of the gear reducer and motor shown. Upon actuation of motor 86, screw 62 is rotated in one direction to, in turn, swing arm 42 and thereby pulley 36 with respect to pulley 30. The length of time that motor 86 is energized will determine the arcuate distance through which pulley 36 will move and will, therefore, determine the amount by which the speed of rotation of shaft 14 is changed. By reversing motor 86, arm 42 is swung in the opposite direction and the speed of rotation of shaft 14 will be changed proportionately. It is clear, therefore, that to selectively vary the speed of shaft 14, motor 86 must be selectively controlled and capable of being remotely actuated.

Structure 88 is provided for actuating motor 86 and includes a pair of legs 90 and 92 rotatably mounted on the proximal outer end of shaft 48 as shown in FIGS. 1, 3 and 4. Legs 90 and 92 are provided with normally closed, electrical switches 94 and 96 respectively, on the outer ends thereof, each of such switches having a shiftable actuating arm 98 which normally engages a respective abutment 100 carried by a plate 102 rigid to and extending downwardly from shaft 48. A spring 104 interconnects switches 94 and 96 and biases legs 90 and 92 toward each other whereby arms 98 of switches 94 and 96 are forced against respective abutments 100. When legs 90 and 92 are in the dispositions shown in FIG. 1 with respect to plate 102, switches 94 and 96 are open and motor 86 deactivated. When, for instance, leg 90 is swung in a clockwise sense, arm 98 is moved away from the respective abutment 100 and switch 94 is closed, whereupon, through electrical circuitry (not shown), motor 86 will be energized to rotate screw 62 in a corresponding direction. Similarly, rotation of leg 92 in a counterclockwise sense will move switch 96 away from the respective abutment 100 to a position sufficient to move the corresponding arm 98 out of engagement with abutment 100 so that switch 96 will close and energize motor 86 in the opposite sense. Thus, screw 62 will rotate in the opposite direction and arm 42 will be swung accordingly.

To selectively swing legs 90 and 92, a triangular plate 106 is rotatably mounted on shaft 48 and is provided with a projection 108 extending laterally therefrom. Projection 108 is disposed between legs 90 and 92 and is engageable therewith to swing the same in response to the rotation of plate 106. A link 110 is pivotally coupled at one end thereof to one corner of plate 106. Link 110 extends upwardly from plate 106 and is pivotally coupled to a crank 112 which, in turn, is pivotally coupled by means of a pin 114 to machine 12. A link 116 interconnects crank 112 with a crank 118 which, in turn, is rotated in either of a pair of opposed directions by a hand lever 120.

A pair of coil springs 122 are secured to arm 42 and extend laterally therefrom. The outermost ends of springs 122 are secured to the upright post 124 on which platform 74 is mounted. Springs 122 neutralize the torque on arm 42 produced by motor 26 and also neutralize the bias force applied to arm 42 by the spring of pulley 30.

In operation, suitable control circuitry is utilized to actuate motor 26. Motor 86 will normally be de-energized and shaft 14 will rotate at a constant speed determined by the location of pulley 36 with respect to pulley 30.

To increase the speed of rotation of shaft 14, for instance, lever 120 is rotated in a clockwise sense which, in turn, also causes plate 106 to rotate in a clockwise sense. Projection 108 will engage leg 90 and rotate the latter in a clockwise sense through a predetermined arcuate distance determined by the arcuate distance through which lever 120 is rotated. Switch 94 will close and energize motor 86 to, in turn, effect rotation of screw 62 in a direction to move arm 42 and thereby pulley 36 toward pulley 30. This is illustrated in FIG. 3 wherein plate 106 has been rotated to, in turn, cause projection 108 to swing leg 90 to a position with the corresponding arm 98 in spaced relationship to the respective abutment 100.

As arm 42 is rotated under the influence of screw 62, plate 102 is rotated with arm 42 and will continue to do so until arm 98 of switch 94 is once again engaged by the respective abutment 100. Switch 94 will then be opened to de-energize motor 86. During the movement of arm 42 toward pulley 30, switch 96 will remain open because of the biasing action of spring 104. The increase in speed of rotation of shaft 14 is, of course, attained by increasing the effective diameter of pulley 30. Power is transmitted, therefore, from motor 26 to shaft 14 in the manner hereinabove set forth.

It is evident that the operator of machine 12 need only move lever 120 to a fixed position in order to attain a desired speed increase or decrease of shaft 14. For this purpose, therefore, a scale or index may be provided in association with lever 102, such scale being calibrated to indicate actual speeds of rotation of shaft 14. To decrease the speed of rotation of shaft 14, lever 120 is swung in a counterclockwise sense so that leg 92 is swung to shift switch 96 away from abutment 100. Switch 96 will then close and energize motor 86 in the opposite sense so that screw 62 will rotate in the opposite direction and swing arm 42 in a counterclockwise sense. Pulley 36 will then be moved away from pulley 30 and the effective diameter of the latter will be decreased so as to decrease the speed of rotation of shaft 38. This decrease in speed will be transmitted to shaft 14 through sprockets 52, 56, 58 and 60.

It can be appreciated that a certain amount of delay time is involved before the speed of shaft 14 is brought to the desired value. It has been determined that this time delay, with mechanism 10, may be no longer than approximately five seconds. However, this time delay is minimal and, in fact, is necessary to permit the drive belts to smoothly conform to the varying pitch of the pulleys. Lever 120 advantageously controls the operation of motor 86 inasmuch as it can be moved to a predetermined position and motor 86 will automatically rotate screw 62 through a predetermined number of revolutions. Such rotation of screw 62 will determine the arcuate distance through which arm 42 will rotate and motor 86 will automatically be deenergized as soon as arm 42 is moved through this distance inasmuch as plate 102 rotates with arm 42 and returns the corresponding abutment to a disposition opening the switch which had previously caused the energization of motor 86. At the new position of pulley 36, shaft 14 will rotate at a constant speed so long as motor 26 is energized.

A particularly important feature of the present drive mechanism is the fact that the shaft 48 from which take-off of power is obtained is located at a fixed point which does not shift during variation of speed of the output sprockets 56 and 58 and which thereby remains a fixed distance from the shaft 32 of main drive motor 26. Additionally, although the shaft 38 remains a fixed distance at all time from take-off shaft 48, the shaft 38 is swingable through an arc permitting a very wide selection of speeds as the shaft 38 is moved toward and away from motor shaft 32.

The range of operating speeds of shaft 14 will be determined by the sizes of the pulleys and sprockets forming parts of mechanism 10, as well as the speed of rotation of the output shaft of motor 26. Variations in the dimensions of all of the foregoing components may be made as desired to vary the range of operating speeds of shaft 14, all of which can be accomplished without departing from the scope of the invention as set forth in the claims appended hereto.

Having thus described the invention, what is claimed as new and desired to be secured by Letters Patent is:

1. A power drive mechanism comprising:
   a prime mover having a rotatable drive shaft;
   a belt and pulley assembly including a first pulley, a second, variable pulley, and an endless, flexible belt interconnecting said pulleys, one of the pulleys being secured to said drive shaft for rotation therewith;
   a support;
   an arm on said support and mounting the other of said pulleys for swinging movement toward and away from said one pulley about an axis spaced from said drive shaft;
   a driven shaft carried by said arm, rigid with said other pulley and journalling the latter for rotation about an axis substantially parallel to the axis of swinging movement of said arm;
   a rotatable output member having an axis of rotation common to said axis of swinging movement of the arm;
   drive means interconnecting said driven shaft and said member; and
   servomechanism coupled with said arm for swinging the latter in opposed directions and including a rotatable screw, a reversible motor coupled to said screw for rotating the latter in opposite directions, a device joining the screw to said arm for moving the latter back and forth about its axis of swinging movement, a pair of legs carried by the support and swingable about said axis of swinging movement of the arm, an electrical switch on each of said legs and movable therewith, an abutment on the support and located to normally maintain the switches in an open condition, said switches being operably coupled to said motor for controlling actuation thereof for operation in opposite directions upon closing of a respective switch, and linkage structure for shifting the legs to move the switches thereon out of engagement with said abutment, said linkage structure including a manually movable control member and a projection movable by said control member for selective engagement with respective legs to swing the latter relative to the abutment to thereby move a corresponding switch into a closed condition whereby said motor is selectively actuated to rotate said screw and shift the arm in opposed directions whereby the speed of rotation of said driven shaft and hence said member is decreased or increased as said other pulley moves toward or away from said one pulley.

2. A power drive mechanism as set forth in claim 1, wherein is included means biasing the legs toward each other.

3. A power drive mechanism as set forth in claim 2, wherein said linkage structure includes a plate rotatably mounted on said support, said projection being carried by said plate and extending laterally therefrom.

References Cited

UNITED STATES PATENTS

| | | | |
|---|---|---|---|
| 2,035,402 | 3/1936 | Perry | 74—230.17 |
| 2,080,319 | 5/1937 | Kingsbury | 74—217 |
| 2,258,776 | 10/1941 | L'Hommedieu et al. | 74—230.17 |
| 2,581,328 | 1/1952 | Malcom | 74—230.17 |
| 2,774,248 | 12/1956 | De Moss | 74—217 |
| 2,927,480 | 3/1960 | Schweickart | 74—217 |
| 3,018,666 | 1/1962 | Hoffman | 74—217 |
| 3,034,368 | 5/1962 | Wingbermuhle | 74—230.17 |
| 2,437,540 | 3/1948 | Klaucke | 74—230.17 |

FOREIGN PATENTS 1,284,676    1/1962    France.

MILTON KAUFMAN, *Primary Examiner.*

FRED C. MATTERN, *Examiner.*

J. A. WONG, *Assistant Examiner.*